United States Patent
Kesari

(10) Patent No.: US 11,601,271 B2
(45) Date of Patent: Mar. 7, 2023

(54) CLOUD-BASED REMOVABLE DRIVE ENCRYPTION POLICY ENFORCEMENT AND RECOVERY KEY MANAGEMENT

(71) Applicant: VMware, Inc., Palo Alto, CA (US)

(72) Inventor: Adarsh Kesari, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 111 days.

(21) Appl. No.: 17/109,239

(22) Filed: Dec. 2, 2020

(65) Prior Publication Data

US 2022/0173904 A1 Jun. 2, 2022

(51) Int. Cl.
G06F 21/45 (2013.01)
G06F 21/78 (2013.01)
H04L 9/08 (2006.01)
H04L 9/40 (2022.01)
H04L 9/32 (2006.01)

(52) U.S. Cl.
CPC ............ H04L 9/0897 (2013.01); G06F 21/45 (2013.01); G06F 21/78 (2013.01); H04L 9/321 (2013.01); H04L 63/20 (2013.01); G06F 2221/2131 (2013.01)

(58) Field of Classification Search
CPC ....... H04L 9/0897; H04L 9/321; H04L 63/20; G06F 21/45; G06F 21/78; G06F 2221/2131
USPC ........................................................ 380/286
See application file for complete search history.

(56) References Cited

U.S. PATENT DOCUMENTS

| | | | | |
|---|---|---|---|---|
| 9,425,958 B2* | 8/2016 | Vennelakanti | ...... | H04W 12/069 |
| 2007/0214369 A1* | 9/2007 | Roberts | .................. | G06F 21/79 |
| | | | | 713/192 |
| 2008/0141040 A1* | 6/2008 | Biddle | ................. | H04L 9/0897 |
| | | | | 713/193 |
| 2009/0028339 A1* | 1/2009 | Goodman | ............... | G06F 21/80 |
| | | | | 380/278 |
| 2010/0266132 A1* | 10/2010 | Bablani | ............... | H04W 12/128 |
| | | | | 380/286 |
| 2013/0332747 A1* | 12/2013 | Roberts | ................. | G06F 21/602 |
| | | | | 713/192 |
| 2014/0351948 A1* | 11/2014 | Urakabe | ................. | G06F 21/53 |
| | | | | 726/26 |
| 2021/0377010 A1* | 12/2021 | Kong | ........................ | H04L 9/14 |
| 2022/0100843 A1* | 3/2022 | Chandrasekaran | ..... | G06F 21/45 |

* cited by examiner

*Primary Examiner* — Thanh T Le
(74) *Attorney, Agent, or Firm* — Thomas Horstemeyer, LLP

(57) ABSTRACT

Examples of cloud-based removable drive encryption policy enforcement and recovery key management are described. In some examples, a removable drive encryption policy is received from a cloud-based management service. A removable drive is recognized by an operating system of a client device. An encryption command causes the operating system to request user password creation and encrypt the removable drive. A recovery key is identified from a write-output of the operating system. The recovery key is transmitted to the cloud-based management service for storage in a cloud-based removable drive recovery key escrow.

20 Claims, 6 Drawing Sheets

CLOUD-BASED REMOVABLE DRIVE ENCRYPTION POLICY ENFORCEMENT AND RECOVERY KEY MANAGEMENT

BACKGROUND

Mobile devices are being used for access to enterprise computing systems and resources with greater frequency. With the growing number of different mobile devices, platforms, and operating systems available for adoption by users, various challenges can arise in the management of the mobile devices. Access to the capabilities of a mobile device can be managed through the administration of the suite of applications based on a set of management policies, compliance rules, and configuration data which is defined and enforced by the management service.

The proliferation of tablet and smartphone devices, for example, has resulted in several companies and organizations allowing employees to bring their own devices to work. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

Drive encryption can be part of the enterprise information security strategy for organizations. Enterprises can enforce operating-system-based encryption technologies to enforce operating system and disk drive encryption to ensure their assets and intellectual property remain secure. However, problems can arise for BYOD implementations and situations where workers bring work devices out of the company intranet or private local area network. Existing technologies can fail to operate properly when a removable drive is connected to a client device that is not networked through an enterprise's intranet or private local area network. For example, where recovery keys are stored in a domain system of record, a recovery key for a newly connected drive will be unknown to the enterprise, leaving the drive contents potentially lost if a password is forgotten. Further, when a password is forgotten, a user of the client device may be unable to retrieve a recovery key unless connected to an enterprise's local area network or private network. As a result, there is a need for better enforcement of removable drive encryption policies and recovery key management.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to cloud-based removable drive encryption policy enforcement and recovery key management. As noted above, drive encryption can be part of an enterprise information security strategy for organizations. Enterprises can enforce operating-system-based encryption technologies to enforce operating system and disk drive encryption to ensure their assets and intellectual property remain secure. However, problems can arise for BYOD implementations and situations where workers bring work devices out of the company intranet or private local area network. Existing technologies can fail to operate properly when a removable drive is connected to a client device that is not networked through an enterprise's intranet or private local area network. Where recovery keys are stored in a domain system of record, a recovery key for a newly connected drive will be unknown to the enterprise, leaving the drive contents potentially lost if a password is forgotten. Further, when a password is forgotten, a user of the client device may be unable to retrieve a recovery key. However, the present disclosure describes mechanisms that solve these issues through cloud-based removable drive encryption policy enforcement and recovery key management.

Figure 1:
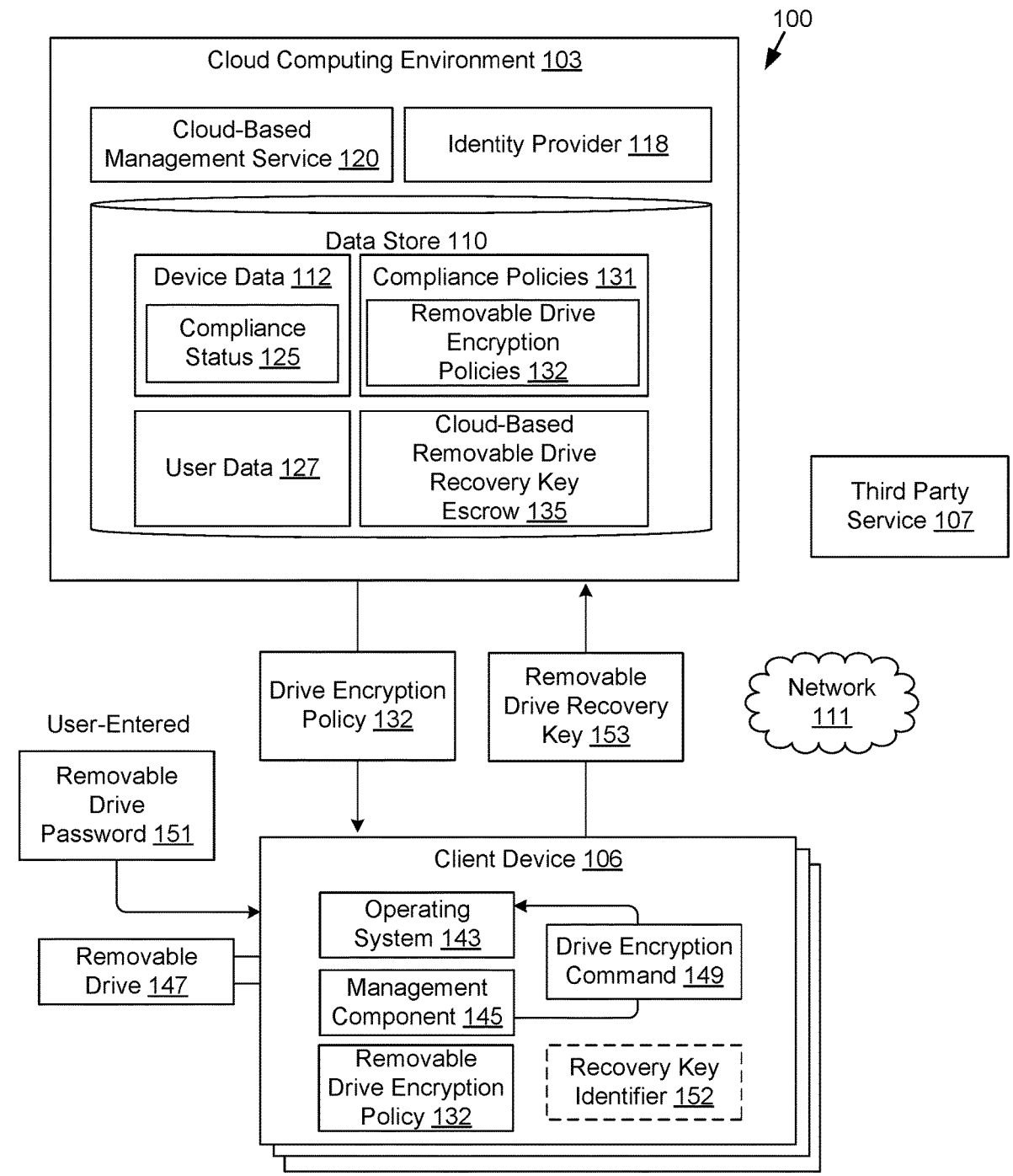
FIG. 1 illustrates an example networked environment for cloud-based removable drive encryption policy enforcement and recovery key management, according to various examples described herein.

FIG. 1 illustrates an example networked environment 100 for cloud-based removable drive encryption policy enforcement and recovery key management according to various examples described herein. The networked environment 100 includes a cloud computing environment 103, several client devices 106, and a third party service 107 in communication through a network 111.

The cloud computing environment 103 can be embodied as one or more computers, computing devices, or computing systems. In certain embodiments, the cloud computing environment 103 can include one or more computing devices arranged, for example, in one or more server or computer banks. The computing device or devices can be located at a single installation site or distributed among different geographical locations. The cloud computing environment 103 can include a plurality of computing devices that together embody a hosted computing resource, a grid computing resource, or other distributed computing arrangement. In some cases, the cloud computing environment 103 can be embodied as an elastic computing resource where an allotted capacity of processing, network, storage, or other computing-related resources varies over time. As further described below, the cloud computing environment 103 can also be embodied, in part, as certain functional or logical (e.g., computer-readable instruction) elements or modules as described herein.

The cloud computing environment 103 can operate as an environment for mobile device management or a UEM platform that can manage the client devices 106. In that context, the cloud computing environment 103 includes a data store 110. The cloud computing environment 103 can also execute a cloud-based management service 120 and an identity provider 118. The data store 110 includes areas in memory for the storage of device data 112, a compliance status 125, user data 127, compliance policies 131, drive encryption policies 132, and a cloud-based removable drive recovery key escrow 135, among other types of data. The cloud-based management service 120 can operate as a UEM platform that can manage client devices 106 that are enrolled as managed devices with the cloud-based management service 120. The cloud-based management service 120 and the cloud-based removable drive recovery key escrow 135 can be accessible over a public wide area network (WAN) such as the Internet. In some cases, the cloud-based removable drive recovery key escrow 135 can be specific to operating system recovery keys used as recovery keys for operating system-based encryption, such as BitLocker® recovery keys. The operating system 143 can include Windows® 10, which can utilize BitLocker® for drive encryption.

Device data 112 can represent information about client devices 106 that are enrolled as managed devices with the cloud-based management service 120. The device data 112 can include a device identifier, certificates associated with the client device 106, a user identifier identifying the user account with which the device is linked, authentication tokens provided by the identity provider 118 to the client device 106, configuration profiles and compliance policies 131 assigned to the client device 106, and other information regarding management of the client device 106 as an enrolled device. The device data 112 can also include a compliance status 125 associated with a managed device. The compliance status 125 can identify which rules or policies the client device 106 or a user account linked to the client device 106 has violated. For example, the client device 106 may have been taken outside of a specified geofence defined for the client device 106. As another example, the client device 106 may have an unencrypted removable drive 147 connected.

In the context of this disclosure, the compliance status 125 can indicate whether the client device 106 is not in compliance with policies or rules specified by a meeting to which a user linked to the client device 106 has accepted on his or her calendar. For example, if the meeting organizer has specified that audible notifications for meeting attendees should be suppressed in order to attend a particular meeting, the compliance status 125 can indicate that the client device 106 of the user is out of compliance if audible notifications are enabled on the client device 106. As another example, a rule associated with a meeting might specify that a camera or microphone of the client device 106 be disabled during the meeting.

User data 127 represents information about users who have user accounts in the enterprise. These users can also have one or more client device 106 that are enrolled as managed devices with the cloud-based management service 120. User data 127 can include authentication data, and information about third party services with which the user is assigned an account.

The removable drive 147 can include a removable memory connected through a bus of the client device 106 in a removable manner. The removable drive 147 can include a universal serial bus (USB) drive connected to the client device 106 using a USB connector, a firewire drive connected to the client device 106 using a firewire connector, or another type of drive connected using a connector that conforms to another interconnection standard. The removable drive 147 can connect to a bus that transfers data between components of the client device 106. The bus can include all related hardware components that facilitate data transfer between components, including wired connections, optical fiber connections, conversion components, and others.

The removable drive recovery key 153 can be a recovery key that is uniquely associated with a removable drive. A removable drive recovery key 153 can include a unique numerical, alphanumerical, or any character-based password that can be used to unlock access to the removable drive 147 if the operating system 143 or its encryption instructions are unable to confirm that access is authorized. In one example, the removable drive recovery key 153 can include a unique 48-digit numerical key. This removable drive recovery key 153 can be saved as a file or printed.

The recovery key identifier 152 can be used in order to identify a removable drive recovery key 153. The recovery key identifier 152 can include a unique numerical, alphanumerical, or any character-based password that can be mapped to the removable drive recovery key 153. For example, an 8 digit numerical key, or a 32 digit alphanumerical key. The recovery key identifier 152 can include or be generated using a hardware address of the removable drive 147. The removable drive password 151 can refer to a user-entered password or an automatically-generated password, which can include a numerical, alphanumerical, or any character-based password.

The removable drive encryption policy 132 can specify drive encryption parameters including a recovery type, drive encryption method or algorithm, cipher strength or number of characters, and other parameters. The recovery type can include a recovery key identifier recovery type, and can specify that the recovery key identifier 152 be written to a file or data location where the management component 145 can read the recovery key identifier 152. The drive encryption parameters can also specify that the removable drive recovery key 153 be written to a file or data location where the management component 145 can read the removable drive recovery key 153. The management component 145 can transmit a drive encryption command 149 that causes the operating system 143 or other instructions or applications executed on the client device 106 to encrypt the removable drive 147 according to the removable drive encryption policy 132. The removable drive password 151 can be entered or generated to conform to specified drive encryption parameters for the removable drive 147.

The cloud-based management service 120 can enroll several client devices 106 for mobile device management services. To begin enrollment, the cloud-based management service 120 can identify and authenticate one of the client devices 106 and store data related to the client device 106 in the device data 112 for later reference. In some cases, the cloud-based management service 120 (or a management component 145, an application, or a component executing on the client device 106) can also be registered as a device administrator (at least in part) of the client device 106, permitting the cloud-based management service 120 to configure and manage certain operating aspects of the client device 106.

Once the client device 106 is enrolled for device management by the cloud-based management service 120, the cloud-based management service 120 can direct the installation of various software components or applications on the client device 106. The software components can be configured on the client device 106 at the direction of the cloud-based management service 120. Such software components can include, for example, applications, resources, libraries, and other related components.

The cloud-based management service 120 can transmit compliance policies 131, compliance rules, and configuration data for execution by and/or enforcement on the client device 106. In that context, during or after enrollment, the cloud-based management service 120 can retrieve or generate a set of management policies, compliance rules, and configuration data for the client device 106 and transfer those policies, rules, and data to the client device 106 for reference by the operating system 143 and certain applications executing on the client device 106.

The cloud-based management service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices according to organizational or other factors or considerations.

The cloud-based management service 120 can ensure compliance of the client device 106 in conjunction with the management component 145 and other instruction executed by the cloud computing environment 103 and the client device 106. For example, the cloud-based management service 120 can transmit the removable drive encryption policy 132 to the management component 145 for enforcement. The management component 145 can request a drive inventory from the operating system 143. The management component 145 can identify, based on a comparison between the current drive inventory and a previous drive inventory, that a new removable drive 147 is connected. The management component 145 can also determine that the new removable drive 147 is unencrypted by an operating-system-based encryption specified in the removable drive encryption policy 132. The management component 145 can enforce the removable drive encryption policy 132 by directing encryption of the removable drive 147 using an operating-system-based encryption such as BitLocker® full volume encryption. In some cases, the operating-system-based encryption can lack a native ability to use a cloud-based removable drive key escrow. While recovery keys can be stored in an enterprise active directory account, this can be inaccessible to the client device 106 based on permissions, or based on the network location of the client device. For example, the enterprise active directory account can be inaccessible unless connected to a private LAN. However, the mechanisms described herein provide secure cloud-based removable drive key management through a cloud-based management service 120 that is unaffiliated with the operating system 143. The cloud-based management service 120 and cloud-based removable drive recovery key escrow 135 can be accessible to the client device 106 through a public LAN, public WAN, and the Internet.

The management component 145 can request a drive inventory from the operating system 143. The management component 145 can transmit the drive inventory to the cloud-based management service 120, which can identify a new removable drive 147 that is currently unencrypted. The cloud-based management service 120 can then identify the removable drive encryption policy 132 mapped to the client device 106 or a user account in the user data 127. The cloud-based management service 120 can transmit instructions for the management component 145 to direct encryption of the removable drive 147 according to the removable drive encryption policy 132.

The identity provider 118 can provide single sign-on or identity management capabilities for an enterprise. The identity provider 118 can allow users to authenticate his or her identity to obtain an authentication token that can be provided to a third party service 107. The identity provider 118 can utilize OAuth, security assertion mark-up language (SAML), or other single sign-on methodologies. The identity provider 118 and cloud-based management service 120 can communicate so that the cloud-based management service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The third party service 107 can be embodied as one or more computers, computing devices, or computing systems. Like the cloud computing environment 103, the third party service 107 can include one or more computing devices arranged, for example, in one or more server or computer banks. The computing device or devices can be located at a single installation site or distributed among different geographical locations. The third party service 107 can include a plurality of computing devices that together embody a hosted computing resource, a grid computing resource, or other distributed computing arrangement. The third party service 107 can also be embodied, in part, as certain functional or logical (e.g., computer-readable instruction) elements or modules as described herein.

The third party service 107 can be a third party service provided by an enterprise to its users. The third party service 107 can federate its authentication for users of the enterprise to the identity provider 118. The third party service 107 can be a cloud-based storage service, recovery key escrow service, or other system for which the identity provider 118 can authenticate access by users of the enterprise. The third party service 107 can be accessible over the Internet or another public WAN. In some cases, the cloud-based management service 120 can access a cloud-based removable drive recovery key escrow 135 that is stored and maintained using functions exposed by the third party service 107. For example, the cloud-based management service 120 can use the identity provider to authenticate with the third party service 107, and can invoke an application programming interface (API) or a function of an API to store, modify, and retrieve removable drive recovery keys 153 stored on a data store 110 of the third party service 107.

For convenience, the management component 145 is discussed as transmitting and receiving the removable drive recovery keys 153 with respect to the cloud-based management service 120. However, the cloud-based management service 120 can work in conjunction with the identity provider 118 and the third party service 107 to provide access to a cloud-based removable drive recovery key escrow 135. In some examples, once authentication is completed by the cloud-based management service 120 and the identity provider 118, the third party service 107 and the client device 106 can communicate directly. The management component 145 can invoke the API or function of the third party service 107 to store, modify, and retrieve removable drive recovery keys 153 from the third party service 107. In other cases, the cloud-based management service 120 can work as a pass-through, where the third party service 107 and can relay communications and/or removable drive recovery keys 153.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the cloud-based management service 120 for device management. A management component 145 can be installed on a client device 106 to locally manage the device on behalf of the remotely executed cloud-based management service 120. The management component 145 can be installed with elevated privileges or be effectuated through operating system APIs to manage the client device 106 on behalf of the cloud-based management service 120. The management component 145 can have the authority to manage data on the client device 106, install, remove, or disable certain applications, or install configuration profiles, such as VPN certificates, Wi-Fi profiles, email profiles, etc.

The management component 145 can also have the authority to enable or disable certain hardware features of the client device 106 in certain instances. For example, the management component 145 can communicate with the operating system of the client device 106 to disable access to the removable drive 147 unless it is encrypted according to a removable drive encryption policy 132. The management component 145 can also place the device into different hardware modes, such as airplane mode, silent mode, do-not-disturb mode, or other modes supported by the client device 106.

The management component 145 can alter operation of the client device 106 in response to commands or policies provided by the cloud-based management service 120 to the client device 106. The management component 145, in one instance, can poll the cloud-based management service 120, or a command queue associated with the cloud-based management service 120, to determine whether a management command intended for the client device 106 has been sent to the client device 106. In response to the command queue having a command for a client device 106, the management component 145 can retrieve the command and execute the command on the client device 106. The command might instruct the management component 145 to install a configuration profile, enforce a restriction or policy, or take other management actions on the client device 106. In one example, the cloud-based management service 120 might detect that the client device 106 is out of compliance with respect to a compliance rule and might instruct the management component 145 to restrict a hardware feature of the client device 106, delete data from the client device 106, or disable certain applications on the client device 106. The management component 145 can also take other variations of management actions on the client device 106 as directed by the cloud-based management service 120.

As part of the enrollment process, the cloud-based management service 120 and/or management component 145 can be registered as a device administrator of the client device 106, permitting the cloud-based management service 120 and/or management component 145 to manage certain operating aspects of the client device 106. In either case, the cloud-based management service 120 can remotely configure the client device 106 by interacting with the management component 145. The cloud-based management service 120 can also transfer various software components to the client device 106, and those software components can be installed and/or configured on the client device 106 at the direction of the management component 145. Such software components can include, for example, applications, resources, libraries, drivers, device configurations, or other related components. The cloud-based management service 120 can also transfer various management policies, compliance rules, and configuration data for enforcement on the client device 106, and those policies, rules, and data can be stored on the client device 106 by the management component 145 The cloud-based management service 120 can then instruct the management component 145 and the operating system of the client device 106 to enforce the management policies, compliance rules, and configuration data stored on the client device 106.

The network 111 can include the Internet, intranets, extranets, wide area networks (WANs), local area networks (LANs), wired networks, wireless networks, cable networks, satellite networks, other suitable networks, or any combinations thereof. As one example, the cloud computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the cloud computing environment 103, the third party service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

Figure 2A:
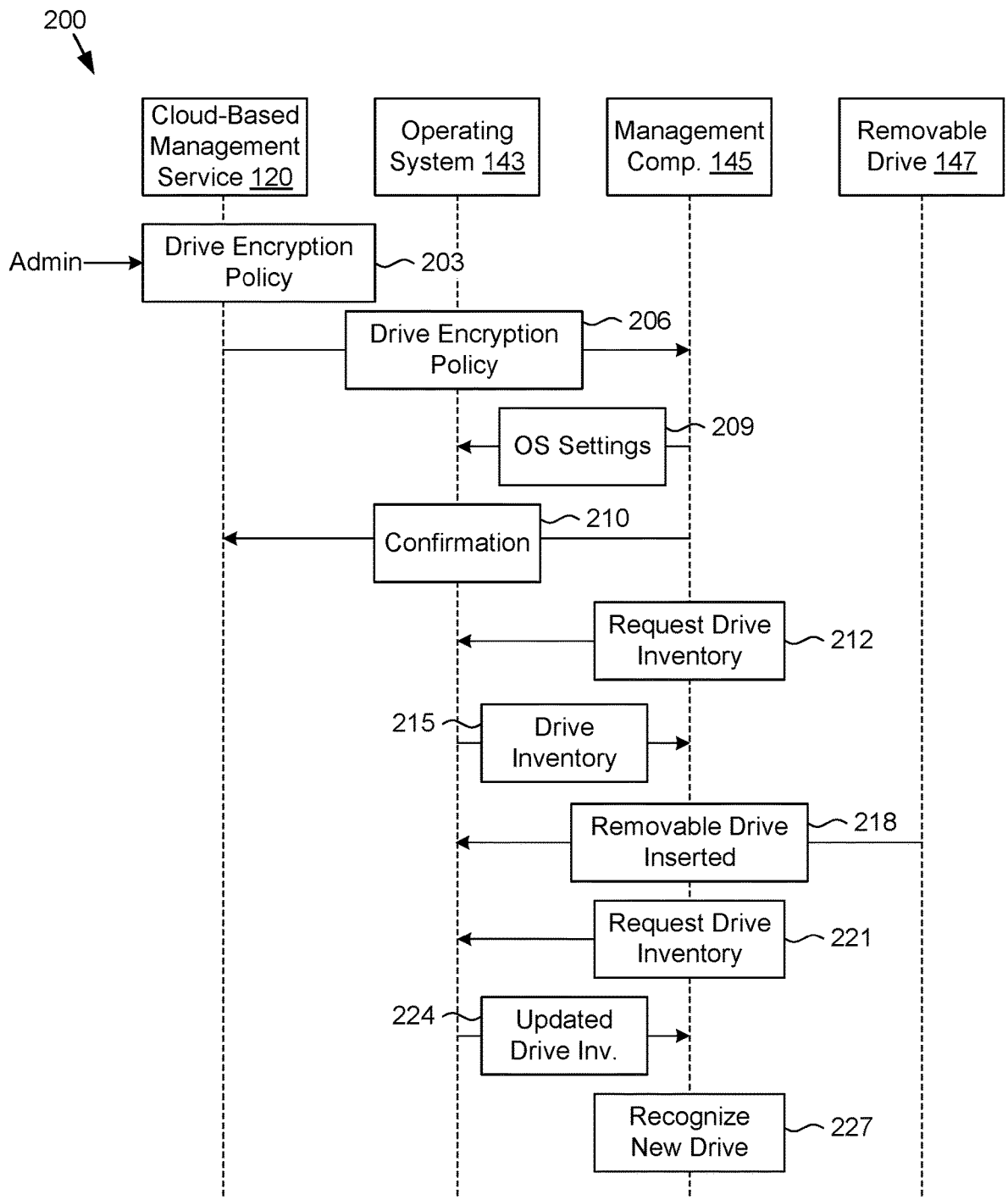
FIGS. 2A-2B illustrate a sequence diagram performed by components of the networked environment, according to various examples described herein.

Moving now to FIG. 2A, shown is an example sequence diagram 200 illustrating interactions between components shown in FIG. 1. Generally, the sequence diagram 200 illustrates how a management component 145 and cloud-based management service 120 can facilitate cloud-based initial drive encryption policy enforcement and cloud-based storage of a removable drive recovery key 153. This enables the removable drive recovery key 153 to be generated and initially stored from any public network, rather than only from a private LAN of the enterprise that manages the client device 106.

At step 203, the cloud-based management service 120 can enable an administrator to create a removable drive encryption policy 132. The cloud-based management service 120 can generate a user interface console through which an administrator can enter or specify drive encryption parameters including a recovery type, drive encryption method or algorithm, cipher strength or number of characters, and other parameters. The user interface console can include user interface elements that the administrator can manipulate to enter or specify desired drive encryption parameters of the removable drive encryption policy 132.

At step 206, the cloud-based management service 120 can transmit the removable drive encryption policy 132 to the management component 145 on a client device 106. For example, the cloud-based management service 120 can place, in a command queue for the client device 106, a command to retrieve the removable drive encryption policy 132. The management component 145 can check in, retrieve the command from the command queue, and implement the command to retrieve the removable drive encryption policy 132 from a network location or address specified by the command. The retrieval of the removable drive encryption policy 132 can include transmission from the cloud-based management service 120 to the client device 106. In other examples, the cloud-based management service 120 can push or otherwise transmit the removable drive encryption policy 132 to the client device 106.

At step 209, the management component 145 can transmit, to the operating system 143, a command to configure operating system settings that implement a drive encryption requirement of the removable drive encryption policy 132. The drive encryption requirement can prevent users from storing data on an unencrypted drive. In some examples, the management component 145 can generate command line arguments to implement the removable drive encryption policy 132, and can enter the command line arguments through to a command prompt. In other cases, the management component 145 can generate operating system calls to invoke a function exposed by the operating system 143 in order to configure settings of the operating system 143.

At step 210, the management component 145 can transmit a confirmation message to the cloud-based management service 120 that indicates the commands have been transmitted or implemented. The cloud-based management service 120 can update the compliance status 125 to indicate that the client device 106 complies with the removable drive encryption policy 132.

At step 212, the management component 145 can transmit a drive inventory request to the operating system 143. The management component 145 can periodically poll for or request the drive inventory in order to recognize whether new drives are connected. The management component 145 can invoke a function exposed by the operating system 143 or enter command line arguments through to a command prompt to request a drive inventory of the operating system 143.

At step 215, the operating system 143 can transmit a drive inventory to the management component 145 or write the drive inventory to a file accessible to the management component 145. The management component 145 can maintain a list of known drives based on previous drive inventories.

At step 218, a removable drive 147 can be inserted and connected to a bus of the client device 106. The operating system 143 can update its drive inventory based on the connection of the removable drive 147.

At step 221, the management component 145 can transmit another drive inventory request to the operating system 143. As indicated earlier, the management component 145 can periodically request the drive inventory in order to recognize whether new drives are connected.

At step 224, the operating system 143 can transmit an updated or current drive inventory to the management component 145 or write the current drive inventory to a file accessible to the management component 145.

At step 227, the management component 145 can recognize that the removable drive 147 is newly connected to the client device 106. In other words, the removable drive 147 can be recognized as a new drive. The management component 145 can also identify that the removable drive is not currently encrypted according to the operating system settings and the removable drive encryption policy 132. The process can continue on FIG. 2B.

Figure 2B:
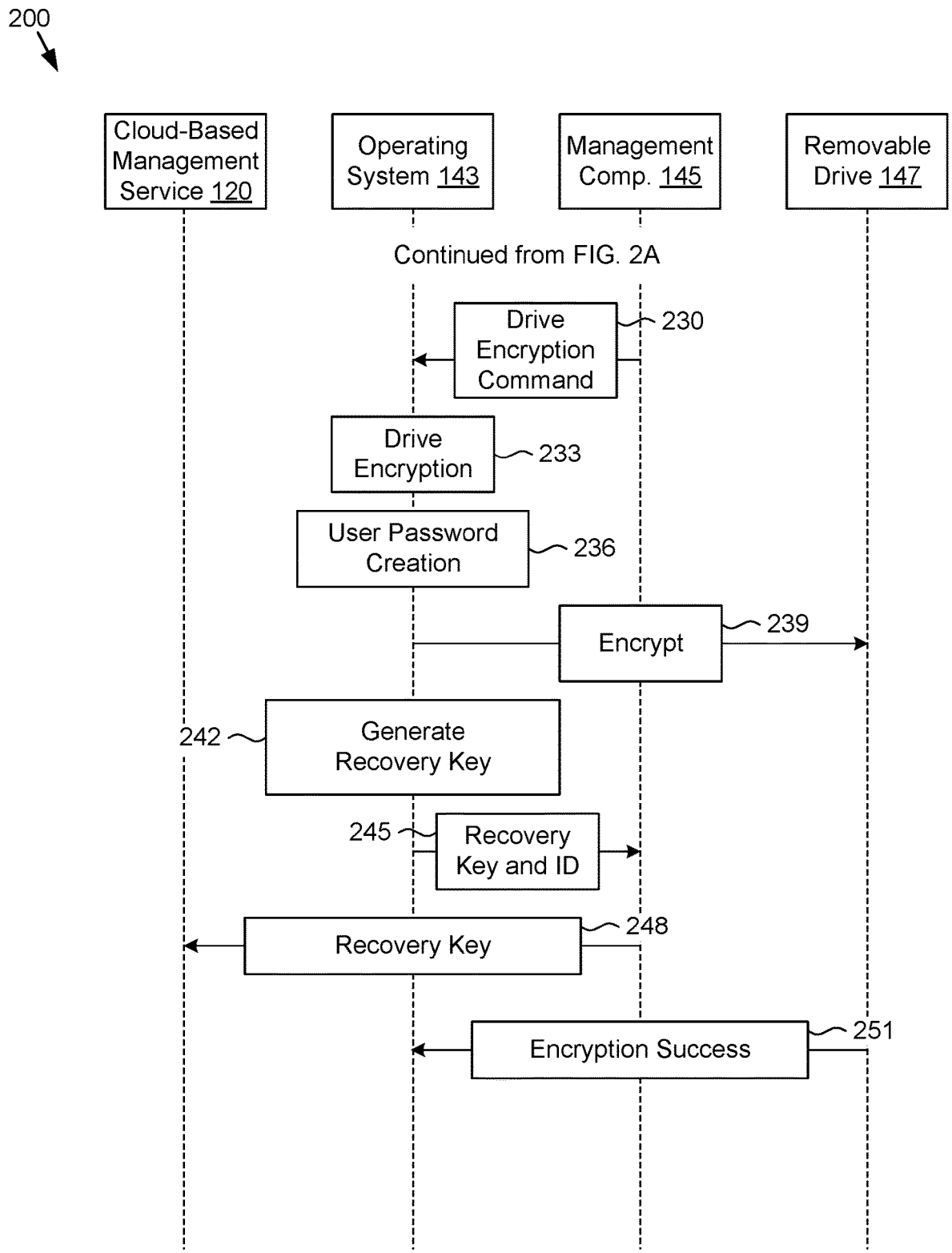

FIG. 2B continues the example sequence diagram 200 of FIG. 2A. The sequence diagram 200 illustrates how a management component 145 and cloud-based management service 120 can facilitate cloud-based removable drive encryption policy enforcement and recovery key management.

At step 230, the management component 145 can transmit a drive encryption command 149 to the operating system 143. The management component 145 can generate the drive encryption command 149 based on the drive encryption parameters specified by the removable drive encryption policy 132. The management component 145 can generate command line arguments or operating system calls that implement the removable drive encryption policy 132 as described earlier.

At step 233, the operating system 143 can initiate the drive encryption process of the removable drive 147. The operating system 143 can perform a drive encryption process as directed by the management component 145. The management component 145 can identify a recovery method, drive encryption algorithm, and cipher strength from the removable drive encryption policy 132 and direct the operating system 143 to encrypt the removable drive 147 based on these parameters. In some cases, the management component 145 can cause the operating system 143 to execute a run manage-bde command or another drive encryption command according to the removable drive encryption policy 132.

At step 236, the operating system 143 can direct a user to enter a removable drive password 151 for the removable drive. The removable drive password 151 can be entered or generated to conform to specified drive encryption parameters for the removable drive 147. This can include a specified minimum and/or maximum number of characters, and required character types.

At step 239, the operating system 143 can initiate encryption of the removable drive 147. The operating system 143 can encrypt the removable drive 147 based on the drive encryption algorithm, cipher strength, and other parameters specified in the removable drive encryption policy 132.

At step 242, the operating system 143 can generate a removable drive recovery key 153 for the removable drive 147. The removable drive recovery key 153 can include a unique password that can be used to unlock access to the removable drive 147 if the operating system 143 or its encryption instructions are unable to confirm that access is authorized. The recovery method specified in the removable drive encryption policy 132 can indicate that the operating system 143 is to generate a removable drive recovery key 153 with a specified number of characters. The operating system 143 can generate the removable drive recovery key 153 to include numbers, lower case letters, capital letters, and special characters as specified by the removable drive encryption policy 132.

The operating system 143 can also generate or identify a recovery key identifier 152. In some cases, the recovery key identifier 152 can include a hardware address or other unique device identifier of the client device 106. In other cases, the operating system 143 can generate the recovery key identifier 152 with a specified number of characters based on the removable drive encryption policy 132. The operating system 143 can generate the recovery key identifier 152 to include numbers, lower case letters, capital letters, and special characters as specified by the removable drive encryption policy 132. The removable drive recovery key 153 and recovery key identifier 152 can be generated prior to, simultaneously with, or after encryption of the removable drive 147.

At step 245, the management component 145 can identify the removable drive recovery key 153 and the recovery key identifier 152. In some cases, the management component 145 can identify the removable drive recovery key 153 by reading a write output file generated by the operating system 143. In other cases, the operating system 143 can display one or more of these identifiers and a user can enter them into a user interface element generated by the management component 145. The management component 145 can store the recovery key identifier 152 in a data store of the client device 106, or transmit the recovery key identifier 152 to the cloud-based management service 120.

If the recovery key identifier 152 is stored with the cloud-based management service 120, then the cloud-based management service 120 can store the recovery key identifier 152 mapped to a unique identifier of the client device 106, so that a recovery key request can be transmitted with the device identifier rather than the recovery key identifier 152. The device identifier can be used to identify the recovery key identifier 152, and the recovery key identifier 152 can be used to query the cloud-based removable drive recovery key escrow 135 for the removable drive recovery key 153.

At step 248, the management component 145 can transmit the removable drive recovery key 153 to the cloud-based management service 120. The cloud-based management service 120 can store the removable drive recovery key 153 in a cloud-based removable drive recovery key escrow 135. The cloud-based removable drive recovery key escrow 135 can be part of the cloud computing environment 103 of the cloud-based management service 120, or a separately-hosted third party service 107. Providing the cloud-based removable drive recovery key escrow 135 enables the removable drive recovery key 153 to be initially stored from any public network, for example, when the client device 106 is unconnected to a private LAN of the enterprise that manages the client device 106. The cloud-based removable drive recovery key escrow 135 also enables recovery of the removable drive 147, for example, when the client device 106 is unconnected to a private LAN of the enterprise that manages the client device 106.

At step 251, the operating system 143 can identify that encryption of the removable drive 147 has completed successfully. The operating system 143 can generate a notification that encryption is complete. In some cases, the notification can be displayed on the client device 106. The management component 145 can identify the notification and transmit an encryption success message to the cloud-based management service 120. The cloud-based management service 120 can update the device data 112 and compliance status based on the notification.

Figure 3:
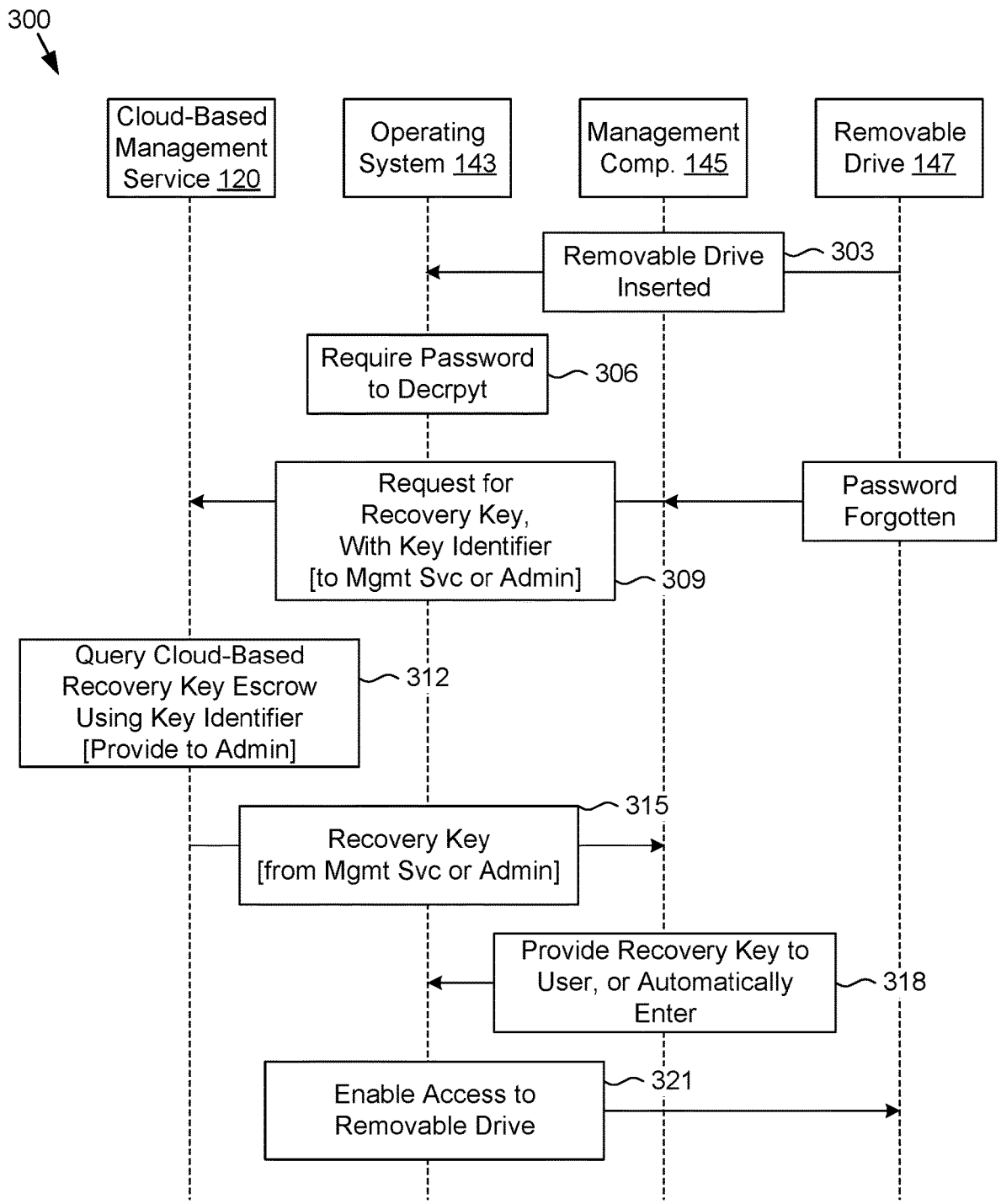
FIG. 3 illustrates another sequence diagram performed by components of the networked environment, according to various examples described herein.

FIG. 3 shows an example sequence diagram 300 illustrating interactions between components shown in FIG. 1. Generally, the sequence diagram 300 illustrates how a management component 145 and cloud-based management service 120 enable recovery of a removable drive 147 when the client device 106 is unconnected to a private LAN of the enterprise that manages the client device 106.

At step 303, a removable drive 147 is inserted and connected to a client device 106. An operating system 143 of the client device 106 can update its drive inventory based on the connection of the removable drive 147. In this example, the removable drive 147 can be already encrypted.

At step 306, the operating system 143 can detect the removable drive 147 and require a password in order to access and decrypt the removable drive 147. As discussed with respect to the sequence diagram 200, the management component 145 can configure settings of the operating system 143 based on a removable drive encryption policy 132 that requires drive encryption in order to access a removable drive 147.

At step 309, the management component 145 can transmit a recovery key request to the cloud-based management service 120. Alternatively, the management component 145 can transmit the recovery key request to an administrator, for example, in an email message, a SMS text message, or a messaging service message, or through a notification on a client device 106 associated with the administrator. The recovery key request can include a recovery key identifier 152. The management component 145 can identify, based on an output from the operating system 143, that password entry attempt has failed a predetermined number of times. Alternatively, the management component 145 can determine that a password entry user interface element has been provided by the operating system 143. The management component 145 can provide user interface elements through which the user can indicate that the password is forgotten. The management component 145 can then retrieve a locally stored recovery key identifier 152 for the removable drive 147.

At step 312, the cloud-based management service 120 can query the cloud-based recovery key escrow using the recovery key identifier 152. The cloud-based removable drive recovery key escrow 135 can include a mapping between the recovery key identifier 152 and the removable drive recovery key 153. The cloud-based removable drive recovery key escrow 135 can provide the removable drive recovery key 153 in response to the query.

At step 315, the cloud-based management service 120 can transmit the removable drive recovery key 153 to the client device 106. In some cases, the cloud-based management service 120 can enter a command to retrieve the removable drive recovery key 153 into a command queue for the client device 106. The management component 145 can check in and execute the command to retrieve the removable drive recovery key 153 from a network address of the cloud-based removable drive recovery key escrow 135 or the cloud-based management service 120. Alternatively, the cloud-based management service 120 can transmit the removable drive recovery key 153 to a user through an email message, a SMS text message, a messaging service message, or through a notification on a client device 106.

At step 318, the management component 145 can provide the removable drive recovery key 153 to enable access to the removable drive 147. In some cases, this can include automatically entering the removable drive recovery key 153 into an appropriate user interface element generated on a display of the client device 106. The management component 145 can also invoke an operating system call or other functions exposed by the operating system 143 in order to provide the removable drive recovery key 153 to the operating system 143. In some cases, the management component 145 can cause the client device 106 to display the removable drive recovery key 153 along with instructions for the user to initiate drive recovery by the operating system 143.

At step 321, the operating system 143 can enable access to the removable drive 147. The operating system 143 can decrypt the removable drive 147 to enable access. In some cases, a new password 151 and removable drive recovery key 153 can be generated as part of a recovery process.

Figure 4:
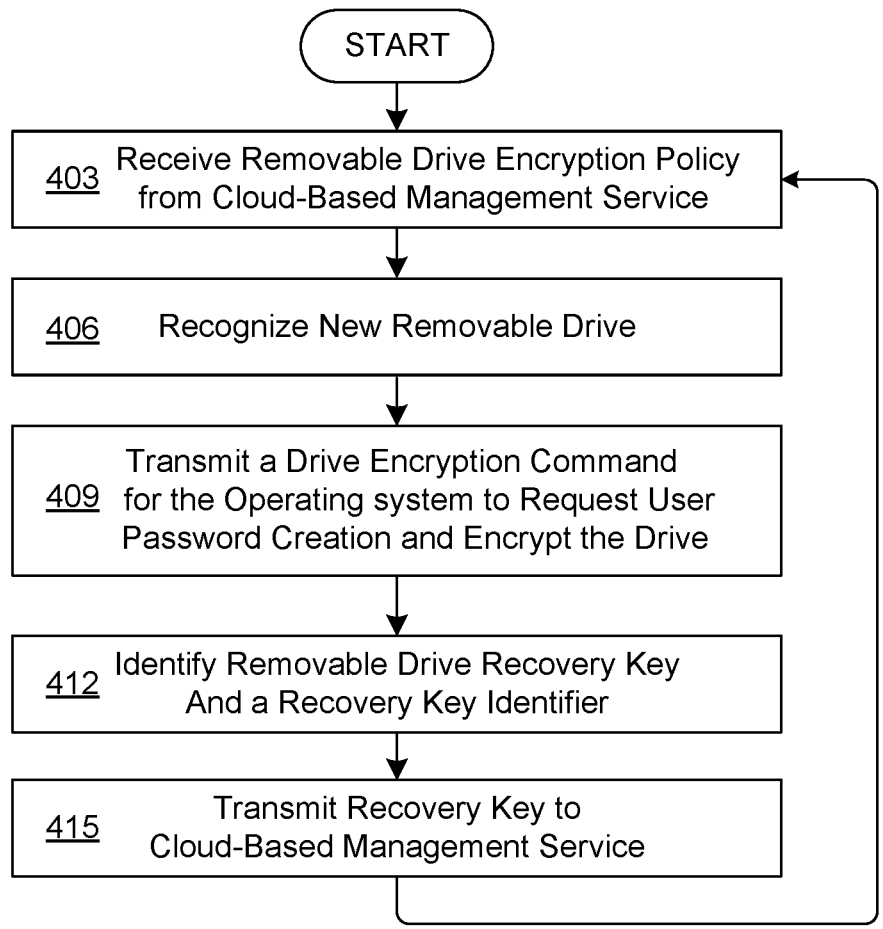
FIG. 4 illustrates a flowchart performed by components of the networked environment, according to various examples described herein.

FIG. 4 shows a flowchart performed by components of the networked environment of FIG. 1. Generally, the flowchart illustrates how a management component 145 interacts with the cloud-based management service 120 to facilitate cloud-based initial drive encryption policy enforcement and cloud-based storage of a removable drive recovery key 153. This enables the removable drive recovery key 153 to be generated and initially stored from any public network, rather than only from a private LAN of the enterprise that manages the client device 106.

At step 403, the management component 145 can receive encryption policy settings from a cloud-based management service 120. For example, the management component 145 can retrieve a removable drive encryption policy 132 from the cloud-based management service 120 or a network address provided by the cloud-based management service 120. The removable drive encryption policy 132 can include operating system settings that implement a drive encryption requirement. The drive encryption requirement can prevent users from storing data on an unencrypted drive. In some examples, the management component 145 can generate command line arguments to implement the removable drive encryption policy 132, and can enter the command line arguments through to a command prompt. In other cases, the management component 145 can generate operating system calls to invoke a function exposed by the operating system 143 in order to configure settings of the operating system 143.

In step 406, the management component 145 can recognize a new removable drive 147. The management component 145 can periodically poll for or request a drive inventory from the operating system 143 in order to recognize whether new drives are connected. The management component 145 can maintain a list of known drives based on previous drive inventories. When a removable drive 147 is inserted and connected to a bus of the client device 106, the operating system 143 can update its drive inventory based on the connection of the removable drive 147.

The management component 145 can transmit a drive inventory request to the operating system 143. The management component 145 can receive a current drive inventory of the operating system 143, and compare it to a previous drive inventory. The management component 145 can be recognized as a new drive. The management component 145 can also identify that the removable drive is not currently encrypted according to the operating system settings and the removable drive encryption policy 132.

In step 409, the management component 145 can transmit a drive encryption command to the operating system 143. The operating system 143 can prevent access or storing data to unencrypted removable drives. In order to facilitate using the new removable drive 147, the management component 145 can direct the operating system 143 to proceed with an encryption process according to the removable drive encryption policy 132. The drive encryption command can execute an encryption process that includes requesting user password creation and encrypting the removable drive 147. The process can also include generation of a removable drive recovery key 153 and a recovery key identifier 152. In some cases, the recovery key identifier 152 is identified based on a device-specific address or unique device identifier of the client device 106.

In step 412, the management component 145 can identify a removable drive recovery key 153 and a recovery key identifier 152. The drive encryption command can cause the operating system to write the removable drive recovery key 153 and the recovery key identifier 152 to one or more files or data locations accessible to the management component 145. The management component 145 can read the files to identify the removable drive recovery key 153 and the recovery key identifier 152.

In step 415, the management component 145 can transmit the removable drive recovery key 153 and the recovery key identifier 152 to the cloud-based management service 120 for storage in a cloud-based removable drive recovery key escrow 135. The cloud-based removable drive recovery key escrow 135 can map the management component 145 and can store the recovery key identifier 152 locally, so that it can be provided to the cloud-based management service 120 and the cloud-based removable drive recovery key escrow 135 to identify the removable drive recovery key 153. In some cases, the management component 145 can remove or delete the removable drive recovery key 153 from the client device 106 as a security precaution. This can enable the management component 145 and the cloud-based management service 120 to ensure compliance status 125 and approved status of a user account prior to retrieval of a removable drive recovery key 153 and recovery of a removable drive 147.

Figure 5:
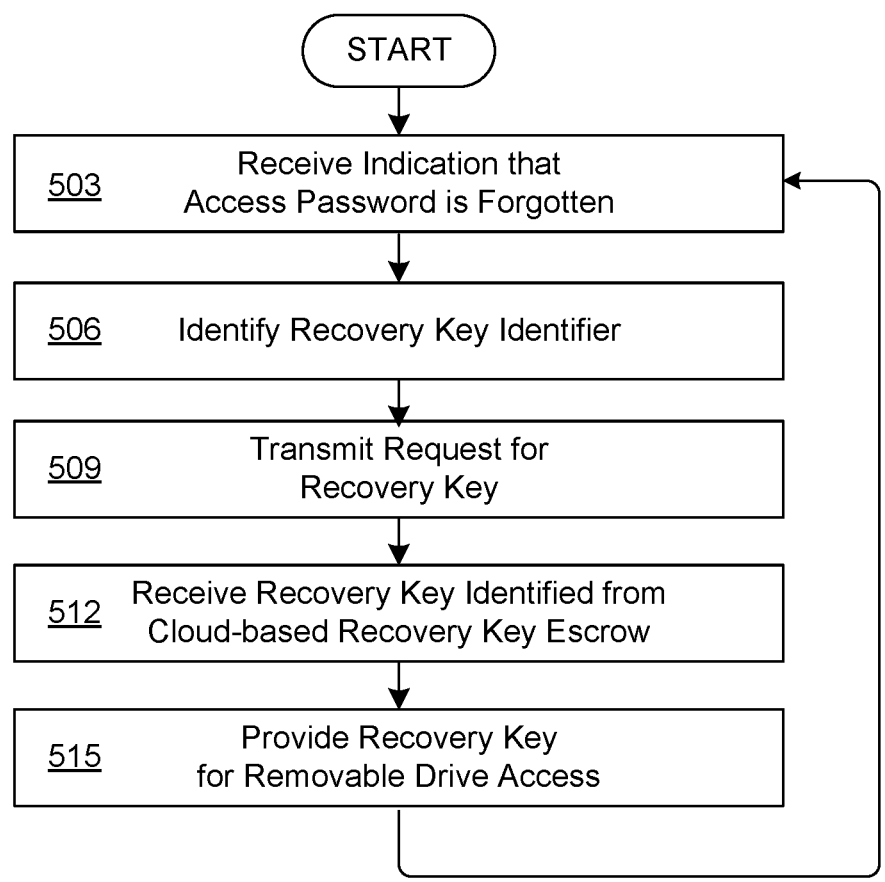
FIG. 5 illustrates another flowchart performed by components of the networked environment, according to various examples described herein.

FIG. 5 shows a flowchart performed by components of the networked environment of FIG. 1. Generally, the flowchart illustrates how a management component 145 interacts with a cloud-based management service 120 to enable recovery of a removable drive 147 when the client device 106 is unconnected to a private LAN of the enterprise that manages the client device 106.

A removable drive 147 can be inserted and connected to a client device 106. In this example, the removable drive 147 can be already encrypted. The operating system 143 can detect the removable drive 147 and require a password in order to access and decrypt the removable drive 147. As discussed with respect to the sequence diagram 200, the management component 145 can configure settings of the operating system 143 based on a removable drive encryption policy 132 that requires drive encryption in order to access a removable drive 147.

In step 503, the management component 145 can receive an indication that a password for the removable drive 147 is forgotten. The management component 145 can identify that password entry has failed a predetermined number of times. Alternatively, the management component 145 can determine that a password entry user interface element has been provided by the operating system 143. The management component 145 can provide user interface elements through which the user can indicate that the password is forgotten.

In step 506, the management component 145 can identify a recovery key identifier 152. For example, the management component 145 can then retrieve a locally stored recovery key identifier 152 for the removable drive 147. In other cases, the management component 145 can identify the recovery key identifier 152 based on a hardware address of the client device 106.

In step 509, the management component 145 can transmit a recovery key request to the cloud-based management service 120. The recovery key request can include a recovery key identifier 152. Alternatively, the management component 145 can transmit the recovery key request to an administrator, for example, in an email message, a SMS text message, a messaging service message, or through a notification on a client device 106 associated with a user account of the administrator.

In step 512, the management component 145 can receive a removable drive recovery key 153 that is identified from the cloud-based removable drive recovery key escrow 135. In some embodiments, the management component 145 can receive or retrieve the removable drive recovery key 153 directly from the cloud-based removable drive recovery key escrow 135. In other embodiments, the cloud-based management service 120 can transmit the removable drive recovery key 153 once identified from the cloud-based removable drive recovery key escrow 135.

In step 515, the management component 145 can provide the recovery key for removable drive access. For example, the management component 145 can automatically enter the removable drive recovery key 153 into a user interface element generated by the operating system 143. The management component 145 can invoke an operating system call or other functions exposed by the operating system 143 in order to provide the removable drive recovery key 153 to the operating system 143. The management component 145 can also cause the client device 106 to display the removable drive recovery key 153 along with instructions for the user to initiate drive recovery by the operating system 143. The operating system 143 can enable access to the removable drive 147.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The cloud computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the cloud-based management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The cloud-based management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the cloud-based management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:
    receiving, by a management component executed by a client device, a removable drive encryption policy from a cloud-based management service;
    identifying, by the management component, that a removable drive is recognized by an operating system of the client device;
    transmitting, by the management component, at least one drive encryption command for the operating system, wherein the at least one drive encryption command causes the operating system to: request user password creation, and encrypt the removable drive;
    reading, by the management component, password recovery data comprising a recovery key, the password recovery data is identified based at least in part on at least one write-output of the operating system;

transmitting, by the management component, the recovery key to the cloud-based management service for storage in a cloud-based removable drive recovery key escrow;

identifying, by the management component, that a password to decrypt the removable drive is forgotten;

identifying, by the management component, a recovery key identifier that is specific to the removable drive; and transmitting, by the management component to the cloud-based management service, a recovery key request comprising the recovery key identifier, wherein the recovery key is identified from the cloud-based removable drive recovery key escrow.

2. The method according to claim 1, wherein the at least one drive encryption command comprises at least one parameter that directs the operating system to perform the at least one write-output.

3. The method according to claim 1, wherein the removable drive is a universal serial bus (USB) drive.

4. The method according to claim 1, further comprising:
transmitting, by the management component, a drive inventory request to the operating system to identify that the removable drive is recognized; and
receiving, by the management component, a current drive inventory based at least in part on the drive inventory request, wherein the removable drive is identified as a new removable drive based on the current drive inventory and a previous drive inventory.

5. The method according to claim 1, further comprising:
receiving, by the management component, the recovery key identified from the cloud-based removable drive recovery key escrow.

6. The method according to claim 5, further comprising:
enabling, by the management component, access to the removable drive by providing the recovery key.

7. The method according to claim 5, wherein the password recovery data comprises the recovery key and the recovery key identifier.

8. A non-transitory computer-readable medium embodying instructions executable by at least one computing device, the instructions, when executed, causing the at least one computing device to at least:
receive, by a management component executed by a client device, a removable drive encryption policy from a cloud-based management service;
identify, by the management component, that a removable drive is recognized by an operating system of the client device;
transmit, by the management component, at least one drive encryption command for the operating system, wherein the at least one drive encryption command causes the operating system to: request user password creation, and encrypt the removable drive;
read, by the management component, password recovery data comprising a recovery key, the password recovery data is identified based at least in part on at least one write-output of the operating system;
transmit, by the management component, the recovery key to the cloud-based management service for storage in a cloud-based removable drive recovery key escrow;
identify, by the management component, that a password to decrypt the removable drive is forgotten;
identify, by the management component, a recovery key identifier that is specific to the removable drive; and transmit, by the management component to the cloud-based management service, a recovery key request comprising the recovery key identifier, wherein the recovery key is identified from the cloud-based removable drive recovery key escrow.

9. The non-transitory computer-readable medium according to claim 8, wherein the at least one drive encryption command comprises at least one parameter that directs the operating system to perform the at least one write-output.

10. The non-transitory computer-readable medium according to claim 8, wherein the removable drive is a universal serial bus (USB) drive.

11. The non-transitory computer-readable medium according to claim 8, the instructions, when executed, further causing the at least one computing device to at least:
transmit, by the management component, a drive inventory request to the operating system to identify that the removable drive is recognized; and
receive, by the management component, a current drive inventory based at least in part on the drive inventory request, wherein the removable drive is identified as a new removable drive based on the current drive inventory and a previous drive inventory.

12. The non-transitory computer-readable medium according to claim 8, the instructions, when executed, further causing the at least one computing device to at least:
receive, by the management component, the recovery key identified from the cloud-based removable drive recovery key escrow.

13. The non-transitory computer-readable medium according to claim 12, the instructions, when executed, further causing the at least one computing device to at least:
enable, by the management component, access to the removable drive by providing the recovery key.

14. The non-transitory computer-readable medium according to claim 12, wherein the password recovery data comprises the recovery key and the recovery key identifier.

15. A system, comprising:
at least one computing device; and
instructions accessible by the at least one computing device, wherein the instructions are executed causing the at least one computing device to at least:
receive, by a management component executed by a client device, a removable drive encryption policy from a cloud-based management service;
identify, by the management component, that a removable drive is recognized by an operating system of the client device;
transmit, by the management component, at least one drive encryption command for the operating system, wherein the at least one drive encryption command causes the operating system to: request user password creation, and encrypt the removable drive;
read, by the management component, password recovery data comprising a recovery key, the password recovery data is identified based at least in part on at least one write-output of the operating system;
transmit, by the management component, the recovery key to the cloud-based management service for storage in a cloud-based removable drive recovery key escrow;
identify, by the management component, that a password to decrypt the removable drive is forgotten;
identify, by the management component, a recovery key identifier that is specific to the removable drive; and transmit, by the management component to the cloud-based management service, a recovery key request comprising the recovery key identifier, wherein the recovery key is identified from the cloud-based removable drive recovery key escrow.

16. The system according to claim 15, wherein the at least one drive encryption command comprises at least one parameter that directs the operating system to perform the at least one write-output.

17. The system according to claim 15, wherein the removable drive is a universal serial bus (USB) drive.

18. The system according to claim 15, wherein the instructions are executed causing the at least one computing device to at least:
transmit, by the management component, a drive inventory request to the operating system to identify that the removable drive is recognized; and
receive, by the management component, a current drive inventory based at least in part on the drive inventory request, wherein the removable drive is identified as a new removable drive based on the current drive inventory and a previous drive inventory.

19. The system according to claim 15, wherein the instructions are executed causing the at least one computing device to at least:
receive, by the management component, the recovery key identified from the cloud-based removable drive recovery key escrow.

20. The system according to claim 19, wherein the instructions are executed causing the at least one computing device to at least:
enable, by the management component, access to the removable drive by providing the recovery key.

* * * * *